3,637,625
LOW TEMPERATURE POLYMERIZATION OF VINYL CHLORIDE IN THE PRESENCE OF A REDOX CATALYST

Robert Buning, Oberlar, Karl-Heinz Diessel, Nienburg, and Gerhard Bier, Troisdorf, Germany, assignors to Dynamit Nobel Aktiengesellschaft, Troisdorf, Germany
No Drawing. Filed May 15, 1968, Ser. No. 729,426
Claims priority, application Germany, June 22, 1967,
P 17 20 481.8
Int. Cl. C08f 3/30, 15/08
U.S. Cl. 260—85.5                                                5 Claims

ABSTRACT OF THE DISCLOSURE

Homo and copolymerization of vinyl chloride with or without comonomers at about −8 to −50° C. in the presence of ascorbic acid, heavy metal salts and a combination of hydrogen peroxide and cyclohexanesulfonylacetyl peroxide as a redox system polymerization catalyst.

---

In a copending patent application Ser. No. 385,508 filed July 27, 1964, now abandoned, and Ser. No. 850,672, filed Aug. 15, 1969, a continuation in part of said first mentioned application, there is described a process for the polymerization and copolymerization of vinyl chloride at temperatures between −8° C. and −20° C. using ascorbic acid, heavy metal salts and peroxides as a redox system. This process is performed as a polymerization in the presence of 8 to 20 wt. percent of a low alcohol and is characterized by the use of cyclohexanesulfonylacetyl peroxide as the peroxide.

Furthermore, the polymerization and copolymerization of vinyl chloride using redox systems of ascorbic acid, heavy metal salts and hydrogen peroxide as the peroxide is in the prior art (French Pat. 1,438,017). When each of hydrogen peroxide or cyclohexanesulfonylacetyl peroxide are used alone, moderately high reaction rates are achieved, however, at temperatures below −20° C., the rate of polymerization decreases so greatly as the temperature decreases that such rate is insufficient for practical purposes. It is true that it is possible to increase this rate of polymerization by using more than 20% lower alcohols in the polymerization, but this leads to thermally unstable polymers whose working qualities are adversely affected. In the case of syndiotactic types of polyvinyl chloride (PVC) manufactured at temperatures below −20° C., however, thermal stability is especially important, since their higher tacticity requires higher working temperatures.

It has now surprisingly been found that vinyl chloride polymers having good working qualities can be obtained using a combination of hydrogen peroxide and cyclohexanesulfonylacetyl peroxide at polymerization temperatures of about −8 to −50° C., and higher polymerization speeds can be achieved in comparison with the use of each of the two peroxides alone. At polymerization temperatures of less than −20 down to −50° C., syndiotactic polymers are obtained by the use of the peroxide combination at good polymerization rates, while the use of each of the peroxides by itself results in unsatisfactory transformations, if any. Furthermore, by the use of the combination of peroxides, a factor influencing the K value becomes active, which can be further reinforced by the addition of regulators.

Products having K values below 90 and down to 50, and especially between 75 and 55 are technically important, it being possible to obtain both reduced and high K values. Chlorinated hydrocarbons like chloroform or trichlorethylene, tetrahydrofuran, acetone, etc., can be used as regulators, in quantities from 1 to 10%.

The two peroxides are used in a molar ratio of from 1:5 to 5:1.

By the process of the invention it is possible to make homopolymers and copolymers of vinyl chloride, using divinyl ether, vinyl acetate, vinyl propionate, vinyl cetyl ether, acrylic esters, acrylonitrile, dichlorethylene, maleic esters, fumaric esters, ethylene, propylene, and other compounds as comonomers, especially in quantities of 2 to 20% of the weight of the vinyl chloride.

The sulfates, chlorides, nitrates and acetates of iron, cobalt, nickel and other heavy metals can be used as the heavy metal salts.

One preferred embodiment of the process is polymerization in tanks equipped with shearing agitators or in rotating cylindrical vessels containing grinding bodies.

The use of ultraviolet light or short-wavelength visible light is not necessary.

In the following examples a comparison is made between polymerizations by the process of the invention and those of the prior art. The yield was determined after 21 hours in each case. The determination of the K values was performed according to Fickentscher (DIN 53,726). The tacticities were determined according to H. Germar et al. (Makromolekulare Chemie 60 (1963) 106–119.)

EXAMPLES

Example 1 (prior art).—500 g. of vinyl chloride, 50 g. of methanol, 1.5 g. of ascorbic acid, 1.5 ccm. of $H_2O_2$ (35% solution) and 0.75 ccm. of $Fe_2(SO_4)_3$ solution in $H_2O$ (1%) are placed at a temperature of −25° C. in a cylindrical vessel made of nickel and having a diameter of 110 mm. and a capacity of 2 liters, along with 8 balls of V2A steel of a diameter of 35 mm. The vessel is rotated on rollers at 50 r.p.m. and maintained at −25° C. by a brine bath. Yield: 51% (in powder form); tacticity 69.9%; K value 98.

Example 2 (prior art).—Example 1 is repeated, but instead of 1.5 ccm. of $H_2O_2$ (35% solution) an equimolecular amount of 4.9 g. of cyclohexanesulfonylacetyl peroxide is used. The yield is only 6%—one which is technically of no interest.

Example 3.—Example 1 is repeated, but instead of 1.5 ccm. of $H_2O_2$ (35% solution), 0.75 ccm. of $H_2O_2$ plus 2.45 g. of cyclohexanesulfonylacetyl peroxide is used. The yield amounts, after 21 hours, to 88%; tacticity 69.8%; K value 79.

Example 4.—Example 3 is repeated with the additional use of 6% trichlorethylene. Yield 71%; K value 69 instead of 79 as in Example 3.

Example 5 (prior art).—Example 1 is repeated at a polymerization temperature of −38° C. Yield 35%. K value 104.

Example 6 (prior art).—Example 2 is repeated at a polymerization temperature of −38° C. Yield 0%.

Example 7.—Example 3 is repeated at a polymerization temperature of −35° C. Yield 75%; K value 88.

Example 8.—Example 3 is repeated, 450 g. of vinyl chloride and 50 g. of vinyl acetate being used instead of 500 g. of vinyl acetate. Copolymer yield. 86%; K value 68.

What is claimed is:
1. In the process of polymerizing vinyl chloride at low temperatures in the presence of a redox system catalyst comprising ascorbic acid, a heavy metal salt and peroxide and 8 to 20 percent of a lower alkanol; the improvement which comprises carrying out said polymerization at about −8 to −50° C. and using as said peroxide a mixture consisting essentially of hydrogen peroxide and cyclo- hexanesulfonylacetyl peroxide in a mol ratio of 1:5 to 5:1.

2. The improved process claimed in claim 1 carried out at about −20 to −50° C.

3. The improved process claimed in claim 1 wherein vinyl chloride is homo polymerized.

4. The improved process claimed in claim 1 wherein vinyl chloride is copolymerized with about 2 to 20 weight percent of at least one comonomer selected from the group consisting of di-vinyl ether, vinyl propionate, vinyl acetate, vinyl cetyl ether, an acrylate, acrylonitrile, dichloroethylene, a maleate, a fumarate, ethylene and propylene.

5. The improved process claimed in claim 1 including subjecting the polymerization reaction mass to shearing or grinding during polymerization.

References Cited
UNITED STATES PATENTS

| | | | |
|---|---|---|---|
| 2,553,325 | 5/1951 | Loritsch | 260—92.8 |
| 2,587,465 | 2/1952 | Ham et al. | 260—85.5 N |
| 2,975,162 | 3/1961 | Iloff | 260—92.8 W |
| 3,466,255 | 9/1969 | Faerber et al. | 260—92.8 W |
| 3,400,103 | 9/1968 | Samour et al. | 260—86.1 E |

HARRY WONG, Jr., Primary Examiner

U.S. Cl. X.R.

260—78.5, 86.3, 87.1, 87.5, 92.8